United States Patent
Hong

(10) Patent No.: US 11,490,300 B2
(45) Date of Patent: Nov. 1, 2022

(54) CELL RESELECTION METHOD AND DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 7 days.

(21) Appl. No.: 16/760,356

(22) PCT Filed: Dec. 11, 2017

(86) PCT No.: PCT/CN2017/115501
§ 371 (c)(1),
(2) Date: Apr. 29, 2020

(87) PCT Pub. No.: WO2019/113756
PCT Pub. Date: Jun. 20, 2019

(65) Prior Publication Data
US 2021/0185574 A1  Jun. 17, 2021

(51) Int. Cl.
*H04W 36/00* (2009.01)
*H04W 36/32* (2009.01)

(52) U.S. Cl.
CPC . *H04W 36/00835* (2018.08); *H04W 36/0072* (2013.01); *H04W 36/32* (2013.01)

(58) Field of Classification Search
CPC ......... H04W 36/0072; H04W 36/0083; H04W 36/00835; H04W 36/14; H04W 36/32;
(Continued)

(56) References Cited

U.S. PATENT DOCUMENTS 7,515,559 B2    4/2009  Koo et al.
2012/0094679 A1*  4/2012  Rao ........................ H04W 48/16
                                                            455/450
(Continued)

FOREIGN PATENT DOCUMENTS

CN    101583169 A    11/2009
CN    102833801 A    12/2012
(Continued)

OTHER PUBLICATIONS

International Search Report and Written Opinion of PCT Application No. PCT/CN2017/115501 dated Aug. 13, 2018.
(Continued)

*Primary Examiner* — Erica Navar
(74) *Attorney, Agent, or Firm* — Finnegan, Henderson, Farabow, Garrett & Dunner, L.L.P.

(57) ABSTRACT

Disclosed are a cell reselection method and device, and a storage medium, which belong to the field of communication technology. The method includes: determining at least two frequency priority rankings carried in a received system message; selecting a target frequency priority ranking from the at least two frequency priority rankings; and carrying out cell reselection according to the target frequency priority ranking. Since the at least two frequency priority rankings are set for different terminal speeds, by means of the cell reselection methods provided by the embodiments of the present disclosure, a terminal can select, according to its own situation, a suitable frequency priority ranking to carry out cell reselection. Thus, the flexibility in carrying out cell reselection by the terminal is improved.

14 Claims, 4 Drawing Sheets

(58) Field of Classification Search
CPC ..... H04W 48/18; H04W 48/20; H04W 36/08; H04W 72/0453; H04W 36/04
See application file for complete search history.

(56) References Cited

U.S. PATENT DOCUMENTS

| | | | |
|---|---|---|---|
| 2014/0153485 A1 | 6/2014 | Tsuda | |
| 2015/0208301 A1 | 7/2015 | Ueda | |
| 2015/0312826 A1* | 10/2015 | Yiu | H04W 48/16 455/437 |
| 2016/0044539 A1* | 2/2016 | Yiu | H04W 48/08 370/235 |

FOREIGN PATENT DOCUMENTS

| | | |
|---|---|---|
| CN | 104620633 A | 5/2015 |
| CN | 105007606 A | 10/2015 |
| WO | WO 2012/054246 A1 | 4/2012 |
| WO | WO 2012/137041 A1 | 10/2012 |
| WO | WO 2014/101184 A1 | 7/2014 |

OTHER PUBLICATIONS

First Office Action of Chinese Application No. 201780001979.6 dated Jun. 24, 2020.
Second Office Action of Chinese Application No. 201780001979.6 dated Sep. 30, 2020.
Extended European Search Report of counterpart EP Application No. 17935039.2 dated Sep. 29, 2020.
Nokia Siemens Networkrs et al.; Miscallaneous corrections to 36.304, 3GPP TSG-RAN WG2 Meeting #65, R2-091812, Athens, Greece, Feb. 9-13, 2009, 30 pages.
Office Communication in counterpart EP Application No. 17935039.2 dated Oct. 26, 2021.

* cited by examiner

US 11,490,300 B2

CELL RESELECTION METHOD AND DEVICE, AND STORAGE MEDIUM

CROSS REFERENCE TO RELATED APPLICATIONS

This application is a national phase application based on PCT/CN2017/115501, filed Dec. 11, 2017, the content of which is incorporated herein by reference.

TECHNICAL FIELD

The present disclosure relates to the field of communication technology, and in particular to a cell reselection method and device, and a storage medium.

BACKGROUND

Currently, to keep a terminal residing in a suitable cell to the greatest extent, the terminal will carry out cell reselection after residing in a certain cell for an appropriate period of time, for example, 1 s.

In the related art, the terminal that needs to carry out cell reselection scans frequencies of all cells that may be accessed, selects, according to a frequency priority ranking carried in a received system message, a frequency with the highest priority from the scanned frequencies, and selects a suitable cell for residence from multiple cells corresponding to the frequency with the highest priority.

SUMMARY

According to a first aspect of embodiments of the present disclosure, a cell reselection method is provided. The method is applied to a terminal and includes:

determining at least two frequency priority rankings carried in a received system message, wherein the at least two frequency priority rankings are set for different terminal speeds;

selecting a target frequency priority ranking from the at least two frequency priority rankings; and selecting a target frequency from multiple scanned frequencies according to the target frequency priority ranking, and selecting one cell from multiple cells corresponding to the target frequency for residence.

According to a second aspect of embodiments of the present disclosure, a cell reselection method is provided. The method is applied to a base station and comprises:

sending a system message that carries at least two frequency priority rankings, wherein the at least two frequency priority rankings are set for different terminal speeds.

According to a third aspect of embodiments of the present disclosure, a terminal includes:

a processor; and a memory configured to store an instruction executable by the processor, wherein the processor is configured to execute the steps of any method as defined in the first aspect.

According to a fourth aspect of embodiments of the present disclosure, a base station includes:

a processor; and a memory configured to store an instruction executable by the processor, wherein the processor is configured to execute the steps of any method as defined in the second aspect.

The technical solutions provided by embodiments of the present disclosure may include the following benefits.

In the embodiments of the present disclosure, since the system message sent by the base station carries at least two frequency priority rankings that are set for different terminal speeds, by means of the cell reselection methods provided by the embodiments of the present disclosure, the terminal can select a suitable frequency priority ranking according to its own speed and carry out cell reselection based on the selected frequency priority ranking when receiving the system message. Thus, the flexibility in carrying out cell reselection by the terminal is improved.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure.

DETAILED DESCRIPTION

Figure 1:
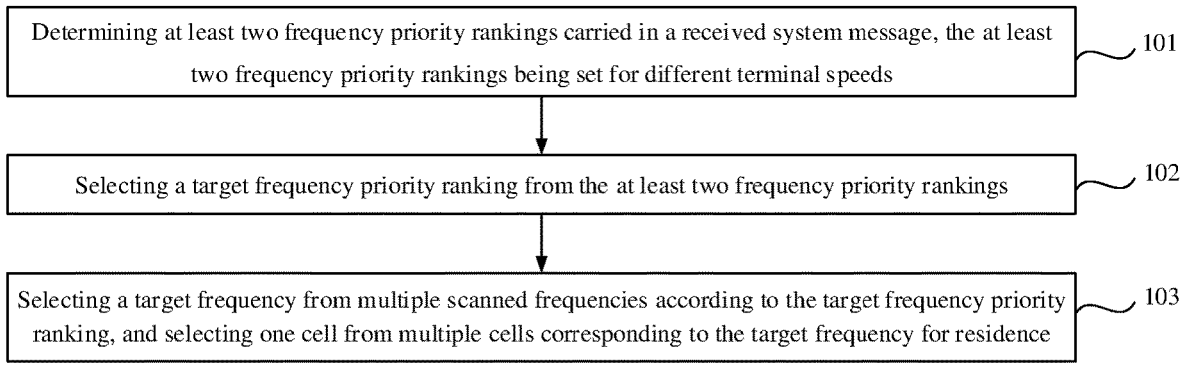
FIG. 1 is a flow chart of a cell reselection method provided by an embodiment of the present disclosure.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

Before explaining the embodiments of the present disclosure in detail, application scenarios of the embodiments of the present disclosure will be described first. Currently, a system message sent by a base station of a high-speed-railway dedicated network and a system message sent by a base station of a public long-term evolution (LTE) network carry the same frequency priority ranking. That is, the frequency priority rankings carried in the system messages sent by the base stations of the high-speed-railway dedicated network and the public LTE network are the same frequency priority ranking. Moreover, in the same frequency priority ranking, a priority of a frequency used by the high-speed-railway dedicated network is usually higher than that of a frequency used by the public LTE network. Therefore, if frequencies scanned by a terminal on a high-speed railway or by a terminal not on the high-speed railway include the frequency used by the high-speed-railway dedicated network, the terminal will preferentially reside in some cell corresponding to the frequency used by the high-speed-railway dedicated network. As a result, the flexibility in carrying out cell reselection by the terminal is reduced.

Therefore, an embodiment of the present disclosure provides a cell reselection method. By means of the method, a terminal can select a suitable frequency priority ranking according to its own speed and carry out cell reselection based on the selected frequency priority ranking. Thus, the flexibility in carrying out cell reselection by the terminal is improved.

FIG. 1 is a flow chart of a cell reselection method provided by an embodiment of the present disclosure. The cell reselection method is applied to a terminal, and includes the following steps as shown in FIG. 1.

In step 101, at least two frequency priority rankings carried in a received system message are determined and are set for different terminal speeds.

In step 102, a target frequency priority ranking is selected from the at least two frequency priority rankings.

In step 103, a target frequency is selected from multiple scanned frequencies according to the target frequency priority ranking, and one cell is selected from multiple cells corresponding to the target frequency for residence.

In the present embodiment, since the system message carries the at least two frequency priority rankings that are set for the different terminal speeds, by means of the cell reselection method provided by the present embodiment, the terminal can select a suitable frequency priority ranking according to its own speed and carry out cell reselection based on the selected frequency priority ranking when receiving the system message. Thus, the flexibility in carrying out cell reselection by the terminal is improved.

Optionally, each frequency priority ranking includes a priority of a frequency used by a first network and a priority of a frequency used by a second network. The at least two frequency priority rankings correspond to at least two speed intervals. In the frequency priority ranking corresponding to a speed interval of which the value is greater than a preset speed, the priority of the frequency used by the first network is higher than that of the frequency used by the second network. In the frequency priority ranking corresponding to a speed interval of which the value is smaller than the preset speed, the priority of the frequency used by the first network is lower than that of the frequency used by the second network.

Optionally, selecting the target frequency priority ranking from the at least two frequency priority rankings includes:
  acquiring its own movement speed;
  selecting a speed interval corresponding to its own movement speed from the at least two speed intervals to obtain a target speed interval; and
  selecting a frequency priority ranking corresponding to the target speed interval from the at least two frequency priority rankings to obtain the target frequency priority ranking.

Optionally, the frequency used by the first network and the frequency used by the second network have no intersection.

All the above optional technical solutions may form optional embodiments of the present disclosure in arbitrary combinations thereof, which will not be repeated one by one in the present embodiment.

Figure 2:
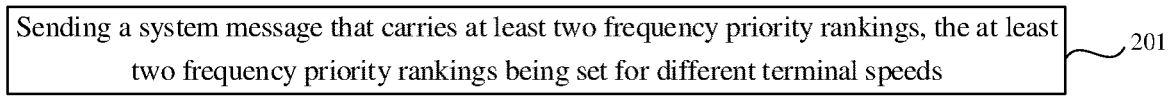
FIG. 2 is a flow chart of another cell reselection method provided by an embodiment of the present disclosure.

FIG. 2 is a flow chart of another cell reselection method provided by an embodiment of the present disclosure. The cell reselection method is applied to a base station and includes the following steps as shown in FIG. 2.

In step 201, a system message that carries at least two frequency priority rankings is sent. The at least two frequency priority rankings are set for different terminal speeds.

In the present embodiment, since the system message sent by the base station carries the at least two frequency priority rankings that are set for the different terminal speeds, by means of the cell reselection method provided by the present embodiment, the terminal can select a suitable frequency priority ranking according to its own speed and carry out cell reselection based on the selected frequency priority ranking when receiving the system message. Thus, the flexibility in carrying out cell reselection by the terminal is improved.

Optionally, each frequency priority ranking includes a priority of a frequency used by a first network and a priority of a frequency used by a second network. The at least two frequency priority rankings correspond to at least two speed intervals. In the frequency priority ranking corresponding to a speed interval of which the value is greater than a preset speed, the priority of the frequency used by the first network is higher than that of the frequency used by the second network. In the frequency priority ranking corresponding to a speed interval of which the value is smaller than the preset speed, the priority of the frequency used by the first network is lower than that of the frequency used by the second network.

Optionally, the frequency used by the first network and the frequency used by the second network have no intersection.

All the above optional technical solutions may form optional embodiments of the present disclosure in arbitrary combinations thereof, which will not be repeated one by one in the present embodiment.

Figure 3:
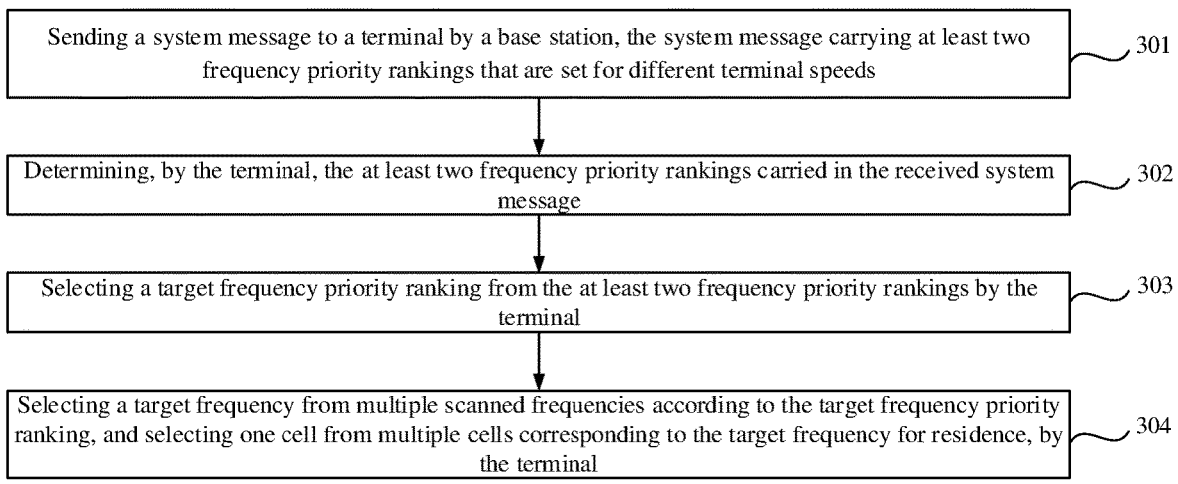
FIG. 3 is a flow chart of yet another cell reselection method provided by an embodiment of the present disclosure.

FIG. 3 is a flow chart of yet another cell reselection method provided by an embodiment of the present disclosure. As shown in FIG. 3, the cell reselection method includes the following steps.

In step 301, a base station sends a system message that carries at least two frequency priority rankings to a terminal. The at least two frequency priority rankings are set for different terminal speeds.

It should be noted that in the present embodiment, to improve the flexibility in carrying out cell reselection by the terminal, any system message sent by the base station carries at least two frequency priority rankings which are set for different terminal speeds, such that the terminal can select a suitable frequency priority ranking based on its own speed.

To facilitate subsequent description, the at least two preset frequency priority rankings are introduced first herein.

Each frequency priority ranking includes a priority of a frequency used by a first network and a priority of a frequency used by a second network. The at least two frequency priority rankings correspond to at least two speed intervals. In the frequency priority ranking corresponding to a speed interval of which the value is greater than a preset speed, the priority of the frequency used by the first network is higher than that of the frequency used by the second network. In the frequency priority ranking corresponding to a speed interval of which the value is smaller than the preset speed, the priority of the frequency used by the first network is lower than that of the frequency used by the second network.

In a possible implementation mode, two frequency priority rankings are preset for two speed intervals, namely, a first speed interval and a second speed interval. The frequency priority ranking corresponding to the first speed interval is a first frequency priority ranking, and the frequency priority ranking corresponding to the second speed interval is a second frequency priority ranking. The first speed interval is a speed interval of which the value is greater than a preset speed, and the second speed interval is a speed interval of which the value is smaller than the preset speed.

At this time, in the first frequency priority ranking, the priority of the frequency used by the first network is higher than that of the frequency used by the second network. In the second frequency priority ranking, the priority of the frequency used by the first network is higher than that of the frequency used by the second network.

For example, the first network is a high-speed-railway dedicated network, and the second network is a public LTE network. With regard to four frequencies F1, F2, F3 and F4, F1 and F2 are the frequencies used by the high-speed-railway dedicated network, and F3 and F4 are the frequencies used by the public LTE network. Two different speed intervals are preset, namely, a first speed interval and a second speed interval. The value of the first speed interval is greater than 200 km/h, and the value of the second speed interval is smaller than 200 km/h.

The first frequency priority ranking set for the first speed interval is as shown in Table 1 below, where the priority of the frequency F1 is set to 8, the priority of the frequency F2 is set to 6, the priority of the frequency F3 is set to 4, and the priority of the frequency F4 is set to 2. That is, in the frequency priority ranking corresponding to the speed interval with a larger value, the priority of the frequency used by the high-speed-railway dedicated network is higher than that of the frequency used by the public LTE network.

TABLE 1

| Frequency | F1 | F2 | F3 | F4 |
|---|---|---|---|---|
| Priority | 8 | 6 | 4 | 2 |

The second frequency priority ranking set for the second speed interval is as shown in Table 2 below, where the priority of the frequency F1 is set to 2, the priority of the frequency F2 is set to 4, the priority of the frequency F3 is set to 6, and the priority of the frequency F4 is set to 8. That is, in the frequency priority ranking corresponding to the speed interval with a smaller value, the priority of the frequency used by the high-speed-railway dedicated network is lower than the priority of the frequency used by the public LTE network.

TABLE 2

| Frequency | F1 | F2 | F3 | F4 |
|---|---|---|---|---|
| Priority | 2 | 4 | 6 | 8 |

As can be seen from Tables 1 and 2, in the present embodiment, it is equivalent to setting two different priorities for any frequency according to the first speed interval and the second speed interval. For example, two priorities are set for the frequency F1, namely, 8 corresponding to a high-speed interval and 2 corresponding to a low-speed interval.

It should be noted that any frequency priority ranking is to rank frequencies of all cells defined in a protocol. Tables 1 and 2 only take the frequencies F1, F2, F3 and F4 as examples for description, and may not constitute a limitation to the disclosed embodiments.

In another possible implementation mode, three frequency priority rankings are preset for three speed intervals, namely, a first speed interval, a second speed interval and a third speed interval. The frequency priority ranking corresponding to the first speed interval is a first frequency priority ranking, the frequency priority ranking corresponding to the second speed interval is a second frequency priority ranking, and the frequency priority ranking corresponding to the third speed interval is a third frequency priority ordering. The values of the first speed interval, the second speed interval and the third speed interval are sequentially reduced.

A reference may be made to the foregoing possible implementation mode for setting a corresponding frequency priority ranking for each speed interval, which will not be described in detail herein.

For example, the value of the first speed interval is greater than 200 km/h, the value of the second speed interval is 200-80 km/h, and the value of the third speed interval is smaller than 80 km/h. That is, in the present embodiment, three different frequency priority rankings are set for three speed intervals.

In addition, it should be noted that in the present embodiment, the frequency used by the first network and the frequency used by the second network have no intersection. For example, when the first network is a high-speed-railway dedicated network and the second network is a public LTE network, it indicates that the frequency used by the high-speed-railway dedicated network and the frequency used by the public LTE network have no intersection. That is, the frequencies used by the high-speed-railway dedicated network and the frequencies used by the public LTE network are predefined in the protocol. In addition, after the frequency used by the high-speed-railway dedicated network is predefined, multiple cells corresponding to the frequency are cells in the high-speed-railway dedicated network. Similarly, after the frequency used by the public LTE network is predefined, multiple cells corresponding to the frequency are cells in the public LTE network.

In step 302, the terminal determines at least two frequency priority rankings carried in the received system message.

In the present embodiment, it is necessary for the terminal that needs to carry out cell reselection to first determine at least two frequency priority rankings carried in the received system message, such that the terminal can select, according to its own situation, a suitable frequency priority ranking to carry out cell reselection.

That the terminal selects the suitable frequency priority ranking to carry out cell reselection according to its own situation may be implemented by the following step 303.

In step 303, the terminal selects a target frequency priority ranking from the at least two frequency priority rankings.

It can be known from step 301 that the at least two frequency priority rankings are set according to different terminal speeds and correspond to at least two speed intervals. Therefore, step 303 may be implemented in the following way: acquiring its own movement speed; selecting a speed interval corresponding to its own movement speed from the at least two speed intervals to obtain a target speed interval; and selecting a frequency priority ranking corresponding to the target speed interval from the at least two frequency priority rankings to obtain the target frequency priority ranking.

Because the terminal selects the speed interval corresponding to its own movement speed from the at least two speed intervals, and then selects the frequency priority ranking corresponding to the target speed interval from the at least two frequency priority rankings, the target frequency priority ranking is the frequency priority ranking corresponding to the speed interval with a relatively large value when the current movement speed of the terminal is relatively high.

Also, in the frequency priority ranking corresponding to the speed interval of which the value is greater than the preset speed, the priority of the frequency used by the first network is higher than that of the frequency used by the second network. Therefore, the terminal will preferentially reside in the frequency used by the first network when the current movement speed of the terminal is relatively high.

For example, the at least two frequency priority rankings are the frequency priority ranking in Table 1 and the frequency priority ranking in Table 2, the value of the speed interval corresponding to the frequency priority ranking in Table 1 is greater than 200 km/h, and the value of the speed interval corresponding to the frequency priority ranking in Table 2 is smaller than 200 km/h. At this time, if the terminal determines that its own movement speed is greater than 200 km/h, it indicates that the terminal may be currently located on a high-speed railway, and the terminal may determine the frequency priority ranking in Table 1 as the target frequency priority ranking, so as to facilitate subsequent cell reselection according to the frequency priority ranking in Table 1.

If the terminal determines that its own movement speed is lower than 200 km/h, it indicates that the terminal may not be currently located on a high-speed railway, and the terminal may determine the frequency priority ranking in Table 2 as the target frequency priority ranking, so as to facilitate subsequent cell reselection according to the frequency priority ranking in Table 2.

The terminal may determine the current movement speed in the following way: the terminal may determine a current position of itself by the global positioning system (GPS) technology every preset time, calculate a movement distance of itself within the preset time based on the determined position, and takes the quotient between the distance and the preset time as its own movement speed.

In addition, the preset time is a duration set in advance, and it may be 5 s, 10 s, 30 s or the like. The preset speed is also a speed set in advance, and it may be 150 km/h, 200 km/h, 300 km/h, or the like.

In step 304, the terminal selects a target frequency from multiple scanned frequencies according to the target frequency priority ranking, and selects one cell from multiple cells corresponding to the target frequency for residence.

After the terminal determines the target priority ranking in step 303, the target priority ranking includes the priorities of the multiple scanned frequencies since the target priority ranking includes the priorities of the frequencies of all cells defined in the protocol. That is, the terminal may directly select the frequency with the highest priority from the multiple scanned frequencies as the target frequency according to the target priority ranking.

After determining the target frequency, the target selects a suitable cell for residence from the multiple cells corresponding to the target frequency since each frequency corresponds to multiple cells. In a possible implementation mode, the terminal may select a cell with the best signal quality for residence from the multiple cells corresponding to the target frequency.

For example, when the terminal determines that Table 1 is the target priority ranking according to step 303, it indicates that the current movement speed of the terminal is relatively high. That is, the terminal may currently be located on a high-speed railway. If the frequencies scanned by the terminal include F2, F3 and F4, since the priority of the frequency F2 is 6, the priority of the frequency F3 is 4 and the priority of the frequency F4 is 2 as shown in Table 1, the terminal may directly determine the frequency F2 with the highest priority as the target frequency, and selects a suitable cell for residence from the multiple cells corresponding to the frequency F2. Since F2 is a frequency used by the high-speed-railway dedicated network, by means of the cell reselection method provided by the present embodiment, the terminal will preferentially reside in the cell corresponding to the frequency used by the high-speed-railway dedicated network when the terminal is located on the high-speed railway.

For example, when the terminal determines that Table 2 is the target priority ranking according to step 303, it indicates that the current movement speed of the terminal is relatively low. That is, the terminal is not currently located on a high-speed railway. If the frequencies scanned by the terminal include F2, F3 and F4, since the priority of the frequency F2 is 4, the priority of the frequency F3 is 6, and the priority of the frequency F4 is 8 as shown in Table 2, the terminal may directly determine the frequency F4 with the highest priority as the target frequency, and select a suitable cell for residence from multiple cells corresponding to the frequency F4. Since F4 is a frequency used by the public LTE network, by means of the cell reselection method provided by the present embodiment, the terminal will preferentially reside in the cell of the public LTE network when the terminal is not located on the high-speed railway. Thus, the high-speed-railway dedicated network can be effectively prevented from congestion.

In the present embodiment, since the system message sent by the base station carries at least two frequency priority rankings that are set for different terminal speeds, by means of the cell reselection method provided by the present embodiment, the terminal can flexibly select the suitable frequency priority ranking according to its own speed and carry out cell reselection based on the selected frequency priority ranking when receiving the system message. Thus, the flexibility in carrying out cell reselection by the terminal is improved. Moreover, when the first network is a high-speed-railway dedicated network and the second network is a public LTE network, by means of the cell reselection method provided by the present embodiment, the terminal can flexibly select a suitable frequency priority ranking, such that the terminal on the high-speed railway will preferentially reside in the cell corresponding to the frequency used by the high-speed-railway dedicated network and the terminal not on the high-speed-railway will preferentially reside in the cell corresponding to the frequency used by the public LTE network. Thus, the possibility of accessing the terminal not on the high-speed railway to the high-speed-railway dedicated network is reduced. Further, the high-speed-railway dedicated network can be effectively prevented from congestion.

Figure 4:
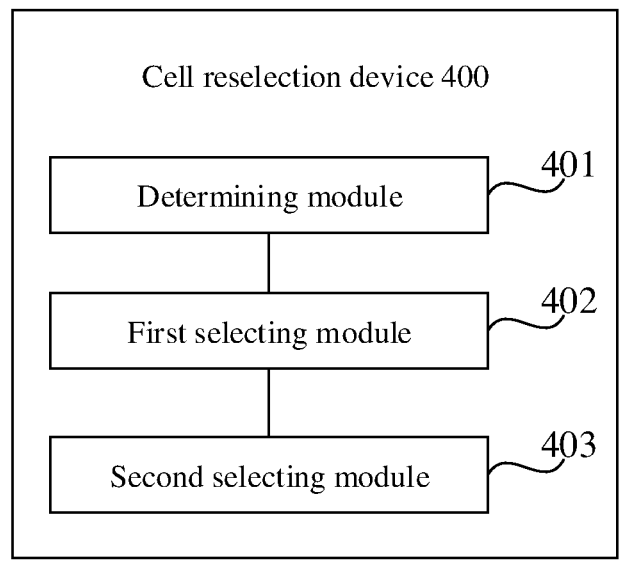
FIG. 4 is a block diagram of a cell reselection device provided by an embodiment of the present disclosure.

FIG. 4 is a block diagram of a cell reselection device 400 provided by an embodiment of the present disclosure. The cell reselection device is applied to a terminal, and includes a determining module 401, a first selecting module 402 and a second selecting module 403 as shown in FIG. 4.

The determining module 401 is configured to determine at least two frequency priority rankings carried in a received system message, wherein the at least two frequency priority rankings are set for different terminal speeds.

The first selecting module 402 is configured to select a target frequency priority ranking from the at least two frequency priority rankings.

The second selecting module 403 is configured to select a target frequency from multiple scanned frequencies according to the target frequency priority ranking, and to select one cell from multiple cells corresponding to the target frequency for residence.

Optionally, each frequency priority ranking includes a priority of a frequency used by a first network and a priority of a frequency used by a second network. The at least two frequency priority rankings correspond to at least two speed intervals. In the frequency priority ranking corresponding to a speed interval of which the value is greater than a preset speed, the priority of the frequency used by the first network is higher than that of the frequency used by the second network. In the frequency priority ranking corresponding to a speed interval of which the value is smaller than the preset speed, the priority of the frequency used by the first network is lower than that of the frequency used by the second network.

Optionally, the first selecting module 402 is specifically configured to:

acquire its own movement speed;

select a speed interval corresponding to its own movement speed from the at least two speed intervals to obtain a target speed interval; and select a frequency priority ranking corresponding to the target speed interval from the at least two frequency priority rankings to obtain the target frequency priority ranking.

Optionally, the frequency used by the first network and the frequency used by the second network have no intersection.

In the present embodiment, since the system message carries the at least two frequency priority rankings that are set for the different terminal speeds, by the cell reselection device provided by the present embodiment, the terminal can select a suitable frequency priority ranking according to its own speed and carry out cell reselection based on the selected frequency priority ranking when receiving the system message. Thus, the flexibility in carrying out cell reselection by the terminal is improved.

Regarding the device in the foregoing embodiment, the specific manners in which the modules perform operations have been described in detail in the method-related embodiment, and thus, will not be described in detail herein.

Figure 5:
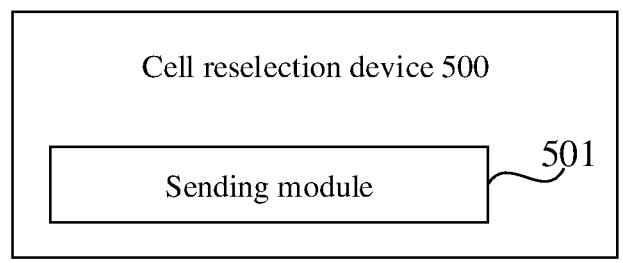
FIG. 5 is a block diagram of another cell reselection device provided by an embodiment of the present disclosure.

FIG. 5 is a block diagram of a cell reselection device 500 provided by an embodiment of the present disclosure. The cell reselection device is applied to a base station, and includes a sending module 501 as shown in FIG. 5.

The sending module 501 is configured to send a system message that carries at least two frequency priority rankings. The at least two frequency priority rankings are set for different terminal speeds.

Optionally, each frequency priority ranking includes a priority of a frequency used by a first network and a priority of a frequency used by a second network. The at least two frequency priority rankings correspond to at least two speed intervals. In the frequency priority ranking corresponding to a speed interval of which the value is greater than a preset speed, the priority of the frequency used by the first network is higher than that of the frequency used by the second network. In the frequency priority ranking corresponding to a speed interval of which the value is smaller than the preset speed, the priority of the frequency used by the first network is lower than that of the frequency used by the second network.

Optionally, the frequency used by the first network and the frequency used by the second network have no intersection.

In the present embodiment, since the system message carries the at least two frequency priority rankings that are set for the different terminal speeds, by the cell reselection device provided by the present embodiment, the terminal can flexibly select a suitable frequency priority ranking according to its own speed and carry out cell reselection based on the selected frequency priority ranking when receiving the system message. Thus, the flexibility in carrying out cell reselection by the terminal is improved.

Regarding the device in the foregoing embodiment, the specific manners in which the modules perform operations have been described in detail in the method-related embodiment, and thus, will not be described in detail herein.

Figure 6:
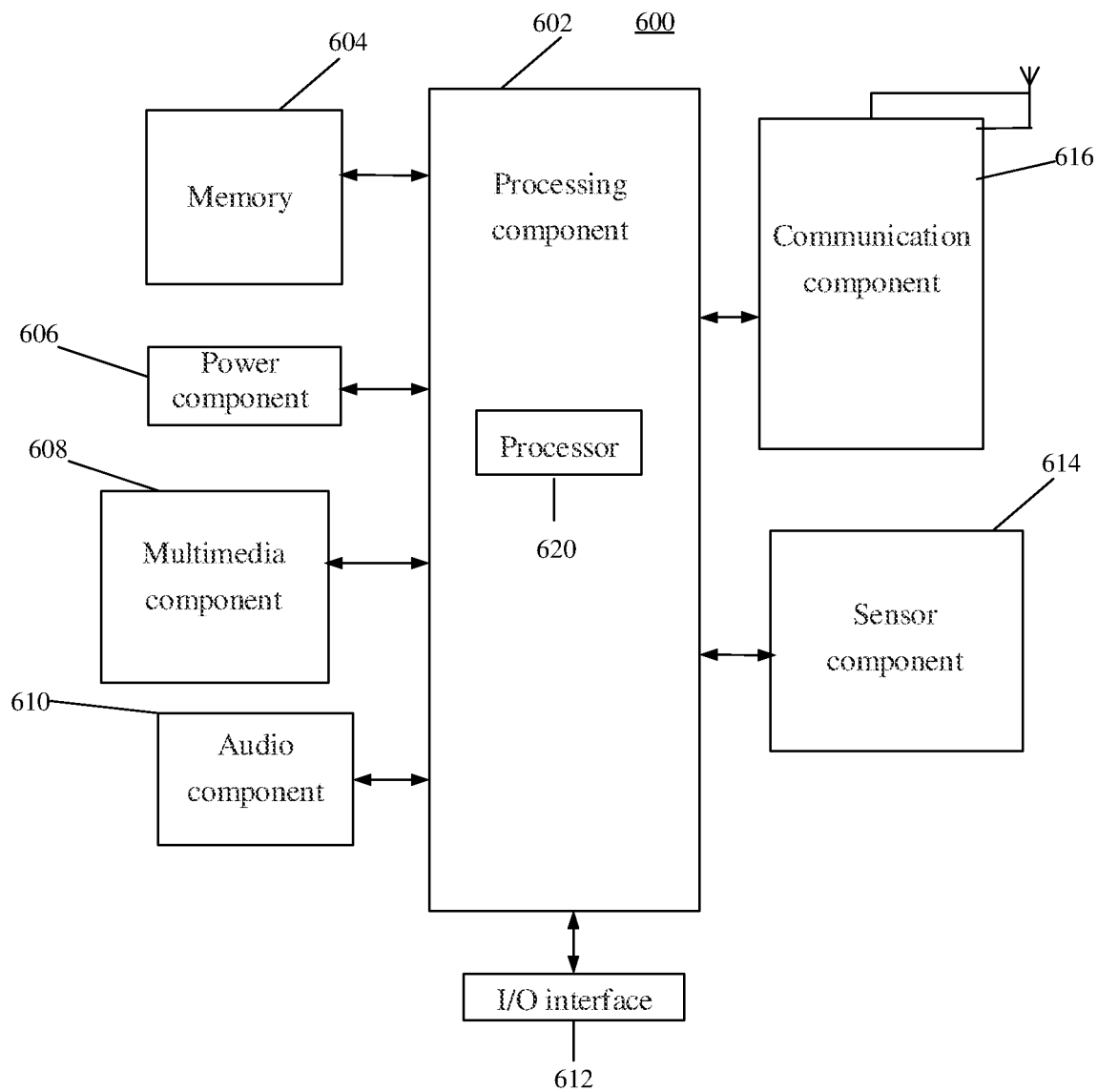
FIG. 6 is a block diagram of yet another cell reselection device provided by an embodiment of the present disclosure.

FIG. 6 is a block diagram of a cell reselection device 600 provided by an embodiment of the present disclosure. The device 600 is applied to any terminal that needs to carry out cell reselection. The device may be a mobile phone, a computer, a digital broadcast terminal, a messaging device, a gaming console, a tablet device, a medical device, a fitness equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 608 includes a front camera and/or a rear camera. The front camera and the rear camera may receive external multimedia data while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive external audio signals when the device 600 is in an operation mode, such as a call mode, a recording mode, and a voice recognition mode. The received audio signal may be further stored in the memory 604 or transmitted via the communication component 616. In some embodiments, the audio component 610 further includes a speaker for outputting audio signals.

The I/O interface 612 provides an interface between the processing component 602 and peripheral interface modules, such as a keyboard, a click wheel, buttons, and the like. The buttons may include, but are not limited to, a home button, a volume button, a start button, and a lock button.

The sensor component 614 includes one or more sensors to provide status assessments of various aspects of the device 600. For instance, the sensor component 614 may detect an on/off status of the device 600, relative positioning of components, e.g., the display device and the mini keyboard of the device 600, and the sensor component 614 may also detect a position change of the device 600 or a component of the device 600, presence or absence of user contact with the device 600, orientation or acceleration/deceleration of the device 600, and temperature change of the device 600. The sensor component 614 may include a proximity sensor configured to detect the presence of nearby objects without any physical contact. The sensor component 614 may also include a light sensor, such as a CMOS or CCD image sensor, used for imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In an exemplary embodiment, the communication component 616 receives broadcast signals or broadcast associated information from an external broadcast management system via a broadcast channel. In an exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 604 including instructions, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a terminal, the terminal can be caused to execute the above cell reselection method provided by the embodiments of the present disclosure.

An embodiment of the present disclosure provides a computer program product with instructions stored therein. When the computer program product runs on a terminal, the terminal can be caused to execute the above cell reselection method provided by the embodiments.

An embodiment of the present disclosure provides a computer program product with instructions stored therein. When the computer program product runs on a terminal, the terminal can be caused to execute the above cell reselection method provided by the embodiments.

Figure 7:
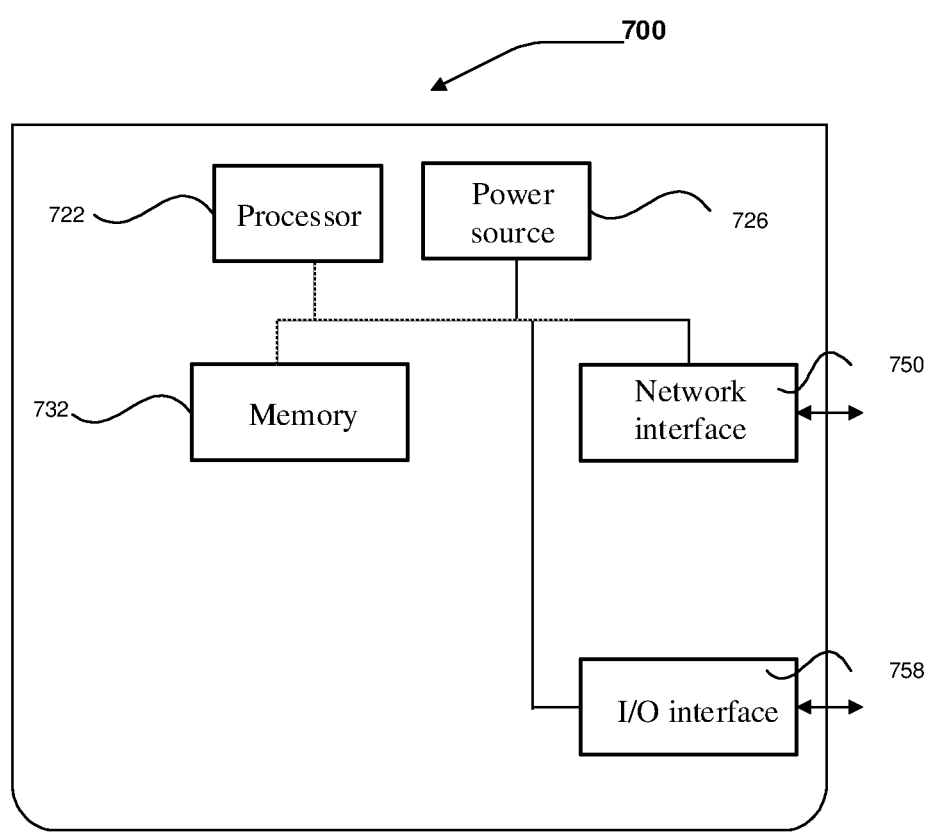
FIG. 7 is a block diagram of yet another cell reselection device provided by an embodiment of the present disclosure.

FIG. 7 is a block diagram of a cell reselection apparatus according to an embodiment of the present disclosure. The apparatus is applied in a base station. With reference to FIG. 7, the apparatus 700 may include a processor 722 including one or more processors and memory resources represented by a memory 732 for storing instructions executable by the processor 722, for example an application program. The application program stored in the memory 732 may include one or more modules, each of which corresponds to a set of instructions. Further, the processor 722 is configured to execute instructions to perform the above cell reselection method provided by the embodiments.

The apparatus 700 may further include a power source 726 for performing power management for the apparatus 700, a wired or wireless network interface 750 configured for connecting the apparatus 700 to a network, and an input/output interface 758. The apparatus 700 can operate an operating system stored in the memory 732, such as Windows Server™, Mac OS X™, Unix™, Linux™, FreeBSD™ or the like.

In exemplary embodiments, a non-transitory computer readable storage medium including instructions is also provided, such as the memory 732 including instructions, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

There is provided a non-temporary computer-readable storage medium. When instructions in the storage medium are executed by the processor of a base station, the base station can be caused to execute the above cell reselection method provided by the embodiments of the present disclosure.

An embodiment of the present disclosure provides a computer program product including instructions. When the computer program product runs on a base station, the base station can be caused to execute the above cell reselection method provided by the embodiments of the present disclosure.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A cell reselection method, applied to a terminal and comprising:
    determining at least two frequency priority rankings carried in a received system message, wherein the at least two frequency priority rankings comprise a first frequency priority ranking corresponding to a speed of the terminal that is higher than a preset speed and a second frequency priority ranking corresponding to a speed of the terminal that is smaller than the preset speed, each of the at least two frequency priority rankings comprises a priority of a frequency used by a high-speed-railway dedicated network and a priority of a frequency used by long-term evolution (LTE) network, in the first frequency priority ranking, the priority of the frequency used by the high-speed-railway dedicated network is higher than that of the frequency used by the LTE network, and in the second frequency priority ranking, the priority of the frequency used by the high-speed-railway dedicated network is lower than that of the frequency used by the LTE network;
    selecting a target frequency priority ranking from the at least two frequency priority rankings according to the speed of the terminal by:
        selecting, in response to the speed of the terminal being greater than the preset speed, the first frequency priority ranking as the target frequency priority ranking; and
        selecting, in response to the speed of the terminal being smaller than the preset speed, the second frequency priority ranking as the target frequency priority ranking; and
    selecting, from multiple scanned frequencies, a frequency with a highest priority in the target frequency priority ranking as a target frequency, and selecting one cell from multiple cells corresponding to the target frequency for residence.

2. The method according to claim 1, wherein
    the at least two frequency priority rankings correspond to at least two speed intervals;
    in a first frequency priority ranking of the at least two frequency priority rankings corresponding to a first speed interval of which a value is greater than the preset speed, the priority of the frequency used by the high-speed-railway dedicated network is higher than the priority of the frequency used by the LTE network; and
    in a second frequency priority ranking of the at least two frequency priority rankings corresponding to a second speed interval of which a value is smaller than the preset speed, the priority of the frequency used by the high-speed-railway dedicated network is lower than the priority of the frequency used by the LTE network.

3. The method according to claim 1, wherein selecting the target frequency priority ranking from the at least two frequency priority rankings comprises:
    acquiring the speed of the terminal;
    selecting a speed interval corresponding to the speed of the terminal from the at least two speed intervals to obtain a target speed interval; and
    selecting a frequency priority ranking corresponding to the target speed interval from the at least two frequency priority rankings to obtain the target frequency priority ranking.

4. The method according to claim 2, wherein the frequency used by the high-speed-railway dedicated network and the frequency used by the LTE network have no intersection.

5. A cell reselection method, applied to a base station and comprising:
    sending a system message that carries at least two frequency priority rankings, wherein the at least two frequency priority rankings comprise a first frequency priority ranking corresponding to a speed of the terminal that is higher than a preset speed and a second frequency priority ranking corresponding to a speed of the terminal that is smaller than the preset speed, each of the at least two frequency priority rankings comprises a priority of a frequency used by a high-speed-railway dedicated network and a priority of a frequency used by a long-term evolution (LTE) network, in the first frequency priority ranking, the priority of the frequency used by the high-speed-railway dedicated network is higher than that of the frequency used by the LTE network, and in the second frequency priority ranking, the priority of the frequency used by the high-speed-railway dedicated network is lower than that of the frequency used by the LTE network,
    to cause the terminal to:
        select a target frequency priority ranking from the at least two frequency priority rankings according to the speed of the terminal by:
            selecting, in response to the speed of the terminal being greater than the preset speed, the first frequency priority ranking as the target frequency priority ranking; and
            selecting, in response to the speed of the terminal being smaller than the preset speed, the second frequency priority ranking as the target frequency priority ranking;
        select, from multiple scanned frequencies, a frequency with a highest priority in the target frequency priority ranking as a target frequency; and
        select one cell from multiple cells corresponding to the target frequency for residence.

6. The method according to claim 5, wherein
    the at least two frequency priority rankings correspond to at least two speed intervals;
    in a first frequency priority ranking of the at least two frequency priority rankings corresponding to a first speed interval of which a value is greater than the preset speed, the priority of the frequency used by the high-speed-railway dedicated network is higher than the priority of the frequency used by the LTE network; and
    in a second frequency priority ranking of the at least two frequency priority rankings corresponding to a second speed interval of which a value is smaller than the preset speed, the priority of the frequency used by the high-speed-railway dedicated network is lower than the priority of the frequency used by the LTE network.

7. The method according to claim 6, wherein the frequency used by the high-speed-railway dedicated network and the frequency used by the LTE network have no intersection.

8. A terminal, comprising:
a processor; and
a memory storing instructions executable by the processor;
wherein the processor is configured to:
determine at least two frequency priority rankings carried in a received system message, wherein the at least two frequency priority rankings comprise a first frequency priority ranking corresponding to a speed of the terminal that is higher than a preset speed and a second frequency priority ranking corresponding to a speed of the terminal that is smaller than the preset speed, each of the at least two frequency priority rankings comprises a priority of a frequency used by a high-speed-railway dedicated network and a priority of a frequency used by long-term evolution (LTE) network, in the first frequency priority ranking, the priority of the frequency used by the high-speed-railway dedicated network is higher than that of the frequency used by the LTE network, and in the second frequency priority ranking, the priority of the frequency used by the high-speed-railway dedicated network is lower than that of the frequency used by the LTE network;
select a target frequency priority ranking from the at least two frequency priority rankings according to the speed of the terminal by:
selecting, in response to the speed of the terminal being greater than the preset speed, the first frequency priority ranking as the target frequency priority ranking; and
selecting, in response to the speed of the terminal being smaller than the preset speed, the second frequency priority ranking as the target frequency priority ranking; and
select, from multiple scanned frequencies, a frequency with a highest priority in the target frequency priority ranking as a target frequency, and select one cell from multiple cells corresponding to the target frequency for residence.

9. The terminal according to claim 8, wherein
the at least two frequency priority rankings correspond to at least two speed intervals;
in a first frequency priority ranking of the at least two frequency priority rankings corresponding to a first speed interval of which a value is greater than the preset speed, the priority of the frequency used by the high-speed-railway dedicated network is higher than the priority of the frequency used by the LTE network; and
in a second frequency priority ranking of the at least two frequency priority rankings corresponding to a second speed interval of which a value is smaller than the preset speed, the priority of the frequency used by the high-speed-railway dedicated network is lower than the priority of the frequency used by the LTE network.

10. The terminal according to claim 8, wherein the processor is further configured to:
acquire the speed of the terminal;
select a speed interval corresponding to the speed of the terminal from the at least two speed intervals to obtain a target speed interval; and
select a frequency priority ranking corresponding to the target speed interval from the at least two frequency priority rankings to obtain the target frequency priority ranking.

11. The terminal according to claim 9, wherein the frequency used by the high-speed-railway dedicated network and the frequency used by the LTE network have no intersection.

12. A base station, comprising:
a processor; and
a memory storing instructions executable by the processor;
wherein the processor is configured to send a system message that carries at least two frequency priority rankings, wherein the at least two frequency priority rankings comprise a first frequency priority ranking corresponding to a speed of the terminal that is higher than a preset speed and a second frequency priority ranking corresponding to a speed of the terminal that is smaller than the preset speed, each of the at least two frequency priority rankings comprises a priority of a frequency used by a high-speed-railway dedicated network and a priority of a frequency used by a long-term evolution (LTE) network, in the first frequency priority ranking, the priority of the frequency used by the high-speed-railway dedicated network is higher than that of the frequency used by the LTE network, and in the second frequency priority ranking, the priority of the frequency used by the high-speed-railway dedicated network is lower than that of the frequency used by the LTE network,
to cause the terminal to:
select a target frequency priority ranking from the at least two frequency priority rankings according to the speed of the terminal by:
selecting, in response to the speed of the terminal being greater than the preset speed, the first frequency priority ranking as the target frequency priority ranking; and
selecting, in response to the speed of the terminal being smaller than the preset speed, the second frequency priority ranking as the target frequency priority ranking;
select, from multiple scanned frequencies, a frequency with a highest priority in the target frequency priority ranking as a target frequency; and
select one cell from multiple cells corresponding to the target frequency for residence.

13. The base station according to claim 12, wherein
the at least two frequency priority rankings correspond to at least two speed intervals;
in a first frequency priority ranking of the at least two frequency priority rankings corresponding to a first speed interval of which a value is greater than the preset speed, the priority of the frequency used by the high-speed-railway dedicated network is higher than the priority of the frequency used by the LTE network; and
in a second frequency priority ranking of the at least two frequency priority rankings corresponding to a second speed interval of which a value is smaller than the preset speed, the priority of the frequency used by the high-speed-railway dedicated network is lower than the priority of the frequency used by the LTE network.

14. The base station according to claim 13, wherein the frequency used by the high-speed-railway dedicated network and the frequency used by the LTE network have no intersection.

* * * * *